Nov. 29, 1932. W. E. MASTERSON ET AL 1,889,208
MOTOR GENERATOR
Filed March 31, 1932 3 Sheets-Sheet 3

Inventors
William E. Masterson,
Henry Price.
By A. J. O'Brien
Attorney

Patented Nov. 29, 1932

1,889,208

UNITED STATES PATENT OFFICE

WILLIAM E. MASTERSON AND HENRY PRICE, OF BORGER, TEXAS, ASSIGNORS OF ONE-FIFTH TO HARRY R. ROGERS, ONE-FIFTH TO JOSEPH F. ROBERTS, AND ONE-FIFTH TO FRANCIS L. COWAN, ALL OF BORGER, TEXAS

MOTOR GENERATOR

Application filed March 31, 1932. Serial No. 602,178.

This invention relates to improvements in motor generators and has reference more particularly to an improvement in motor generators of the general type shown and described in our copending application Serial No. 541,412, filed June 1, 1931.

It is the object of this invention to produce a self-contained motor generator in which the generator surrounds the motor and in which both the motor and generator are interconnected mechanically so as to rotate at a predeterminate speed ratio with respect to each other.

Another object of this invention is to produce a motor generator in which the motor is actuated by means of a series of field magnets so spaced with respect to the armature that each time one of the magnets is energized it will rotate the armature through a small angle and in this way a powerful torque can be obtained.

The above and other objects that may become apparent as this description proceeds are attained by means of a construction and an arrangement of parts that will now be described in detail, and for this purpose reference will be had to the accompanying drawings in which the preferred embodiment of the invention has been illustrated, and in which.

Figure 1:
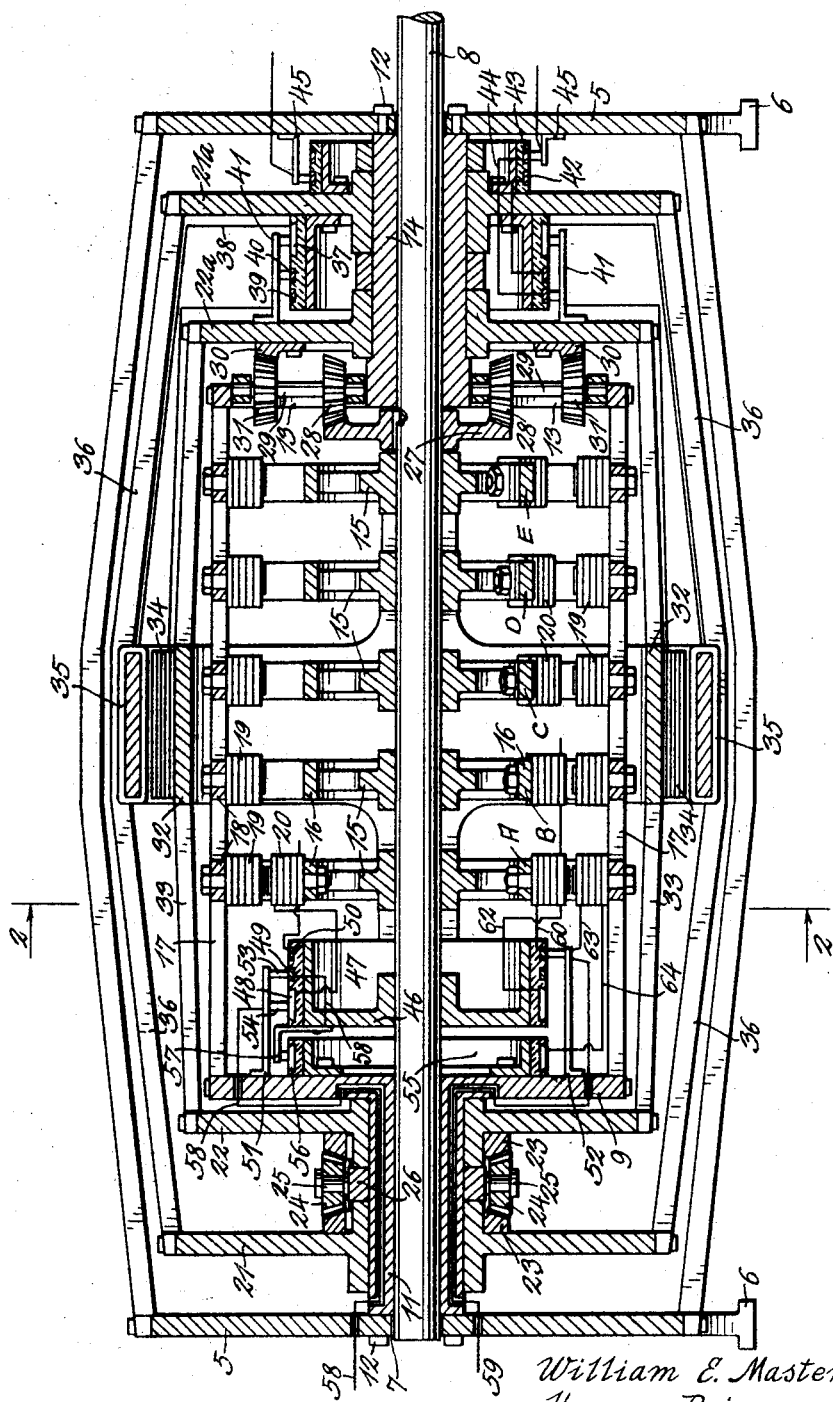
Fig. 1 is a longitudinal diametrical view of the motor generator that forms the subject of this invention.

In the drawings reference numeral 5 indicates a supporting frame which is provided with feet 6 that rest on the surface of the floor or other support. The end members 5 of the frame are provided with openings 7 through which the supporting shaft 8 extends. The end member 9 of the motor field frame is provided with an elongated hub or sleeve 11, whose end is secured to the end member 5 by means of bolts 12. At the other end of the motor frame is another end member 13 that is also provided with a tubular hub 14 corresponding to the hub 11 at the other end. Hub 14, like hub 11, is secured to the adjacent end member 5 by means of bolts 12. The shaft 8 is mounted for rotation in the elongated hubs 11 and 14, and has secured to it five spiders 15, each of which has a rim 16 attached to the outer ends of the spokes and to this rim are secured eight armature magnets 20. The motor end frames 9 and 13 are connected by a number of bars 17 which in turn are joined by arcuate members 18 that may be integral with bars 17 and which form rings extending around the motor field and form a frame from which the field magnets are supported. It will be seen from Fig. 2 that the armature magnets 20 are spaced equidistantly or forty-five degrees apart, whereas, the motor field magnets 19 are spaced different distances.

Figure 2:
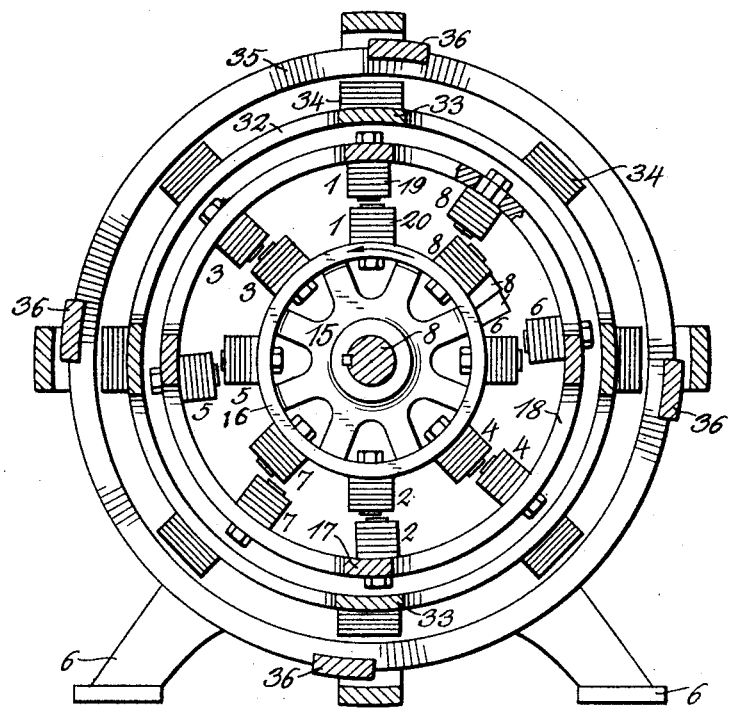
Fig. 2 is a transverse section taken on line 2—2, Fig. 1.
Figure 3:
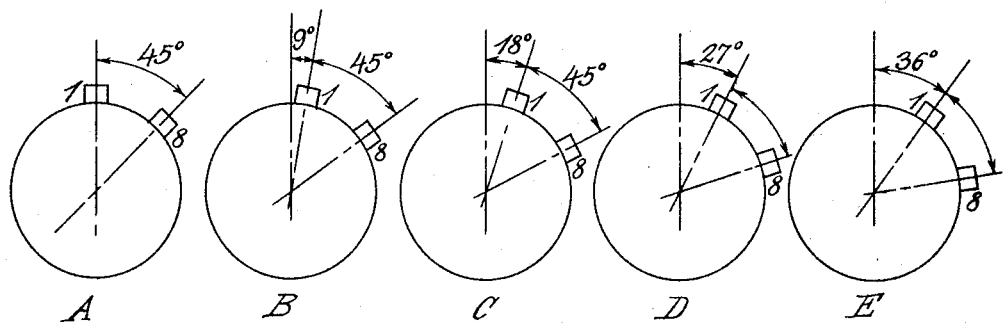
Fig. 3 is a diagram showing the progressive positions of the motor armature during its operation.

For the purpose of facilitating the description the field magnets 19 and the armature magnets 20 have applied to them numbers 1 to 8 which numbers indicate pairs of magnets and the order in which they are energized. It will be seen from Fig. 2 that the pairs of magnets have not been numbered consecutively but so that the next higher number is substantially one hundred eighty degrees from the lower number for reasons that will appear as the description proceeds. Since there are eight field magnets and eight armature magnets and since one pair is energized at a time, it will require eight energizations of eight pairs of field and armature magnets to move the armature a distance equal to the distance between the centers of the magnets of pair 8. In the construction contemplated, the energization of each pair of magnets will move the armature one-eighth of the distance between centers of the two magnets forming pair 8, shown in Fig. 2 or nine degrees, therefore the movement during each energization is one and one-eighth degree. Attention has already been called to the fact that the distances between the adjacent motor field magnets does not vary by equal increments. Referring to Fig. 2, the distance between the centers of the two magnets 19 and 20 forming the pair indicated by numeral 1 is one and one-eighth of a degree, while the distance between the centers of the magnets forming the pair indicated by reference numeral 2 is two and two-eighths of a degree, and in a similar way the distance between the centers of the magnets of the other pairs is equal to one and one-eighth of a degree multiplied by the number placed adjacent the magnets. It will now be observed from Fig. 2 that the motor armature magnets are not placed in a line parallel with the axis of rotation, but are spiraled about the shaft. The displacement between corresponding armature magnets on each armature ring is nine degrees, as shown in Fig. 3 B. From this diagram it will be noticed that the distance between consecutive magnets on the same armature spider rim is forty-five degrees and that the magnets on the next armature spider rim are retarded nine degrees, as shown in B, Fig. 3. The corresponding magnets on ring C are retarded eighteen degrees as indicated by Fig. 3, while those on ring D are retarded twenty-seven degrees and those on ring E are retarded thirty-six degrees. Since the energization of the eight field magnets of the motor on each rim produces a rotary movement of only nine degrees, then it requires the energization of all of the magnets in each of the five rings to rotate the armature forty-five degrees, and it is therefore necessary to energize the different pairs of magnets eight times in order to produce one complete revolution of the motor.

Before proceeding farther with the description, attention will now be called to the principal features of the construction of the generator and also to the interconnecting means between the motor and the generator and between the generator field and the generator armature. Rotatably secured to the outside of the hub 11 is a generator armature end frame 21 and a generator field end frame 22. The adjacent surfaces of these end frames are provided with annular ring gears 23 between which are located pinions 24. These pinions are connected to stub shafts 25 that are carried by a ring 26 located between the adjacent ends of the hubs on members 22 and 21. The ring gears 23 and the pinions 24 produce a differential gearing that causes the two end members 21 and 22 to rotate in opposite directions at the same speed, it being understood, of course, that the ring 26 is held against rotation on the hub 11.

Referring now to the other end of Fig. 1, it will be seen that there is mounted for rotation on the hub 14 a generator armature end frame 21a and a generator field end frame 22a. These correspond in function to end members 21 and 22 at the other end. Secured to the shaft is a beveled gear 27 with which is operatively connected one or more pinions 28. These pinions are carried on shafts 29 that are mounted for rotation about radial axes. The shafts 29 are journaled in suitable bearings in the end member 13. Secured to the inner surface of end member 22a in an annular ring gear 30 and secured to each of the shafts 29 is a pinion 31 that meshes with the gear 30. It will now be seen that since member 13 is stationary, whenever the shaft rotates in one direction, it will rotate the generator field frame in the opposite direction. The interconnecting means just shown and described is such that whenever the motor turns it will cause a corresponding rotation of the generator field and by means of the differential gears interposed between the generator field and the generator armature these will revolve in opposite directions with respect to each other.

Secured to the generator field frame 32, which in turn is supported from the end members by longitudinally extending bars 33, are field magnets 34. the generator armature has been indicated by reference numeral 35 and is of the Gramme ring type. Owing to the fact that the generator is of the usual construction, the description of its several parts will not be gone into in greater detail than absolutely necessary. The generator armature is carried by longitudinally extending frame members 36.

Secured to the inner surface of the generator armature end frame member 21a is a commutator 37. The several segments of this commutator are connected by means of conductors 38 to different points on the generator armature in the usual manner. Located adjacent to the commutator are two slip rings 39 and 40, and attached to the outside of the generator field end frame 22a are brush holders 41. Both of these brush holders have brushes that contact with the commutator in the usual manner and each has a single brush that contacts with a slip ring. Secured to the outside of the generator armature end frame 21a is another assembly carrying two slip rings 42 and 43, these rings are connected with the rings 39 and 40 by suitable conductors 44. Attached to the inner surface of frame member 5 are brush holders 45, each of which has a brush connecting with one of the slip rings. It is evident that when the generator is operating the current can be taken off from the machine by means of the two sets of slip rings and the brush which have just been described.

Figure 4:
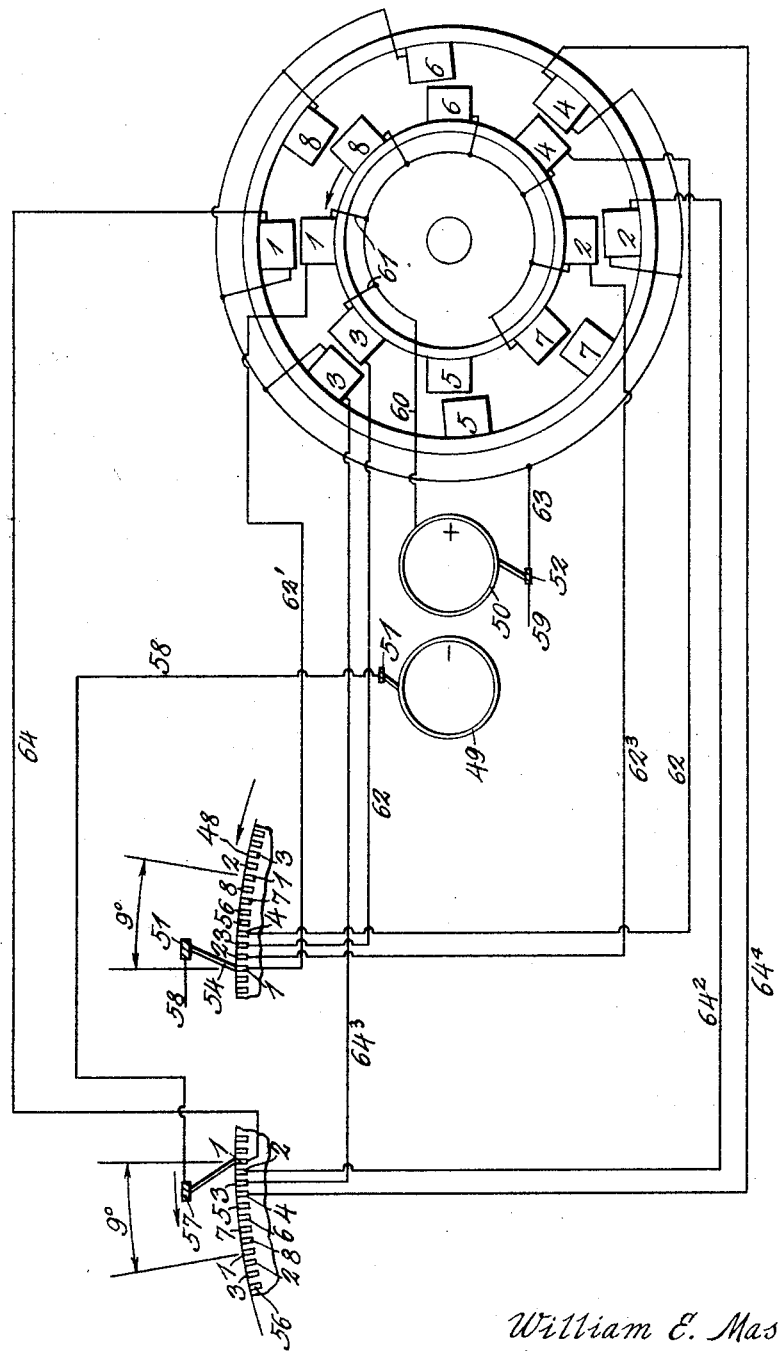
Fig. 4 is a diagram showing the wiring connections employed for the motor.

We will now explain the wiring connections employed in connection with the motor and for this purpose reference will be had more particularly to Figs. 1 and 4. Referring now to Fig. 1 it will be seen that there has been secured to the shaft a pulley like member 46 having a cylindrical surface 47 to which a commutator 48 is attached. Two slip rings 49 and 50 are also carried by the outer surface of member 27. Attached to the inner surface of the motor field frame end member 9 are brush holders 51 and 52. The brush holder 51 has a brush 53 that contacts with slip ring 49 and another brush 54 that contacts with the commutator. Secured to the inner surface of member 9 is a ring 55 that carries a commutator 56. Attached to the member 46 is a brush holder 57 that has a single brush that contacts with the commutator segments of commutator 56.

The current for the operation of the motor is conducted to it through conductors 58 and 59. The conductor 58 connects with the brush holder 51, while conductor 59 connects with brush holder 52. It will be seen that by means of the brush holder and brushes illustrated, the current is conducted to the two slip rings from which it is distributed to the different magnets in a manner that will now be described.

In Fig. 4 one of the slip rings has been indicated as positive, while the other has been indicated as negative, but this is merely for convenience, as the polarity can be arranged as may be desired. Extending from the positive slip ring 50 is a conductor 60 that has branches 61 leading to each of the motor armature field magnets. A lead corresponding to those designated as $62^1$ and $62^3$ extends from each of the motor armature field magnets to one of the segments of the commutator 48. It is now apparent that when the commutator 48 rotates, that current will be connected to the different motor field magnets. The energization of these magnets, instead of being consecutive as has already been explained, is in accordance with the numbering shown on Fig. 4. Another conductor 63 is connected to each of the motor field magnets in the same way as conductor 60 is connected to the motor armature magnets. From each of the motor field magnets, a conductor like those designated by $64^2$ and $64^4$ extends to a segment on the commutator 56. The different numbers applied to the commutator segments indicate the respective magnets that are energized whenever the brush is in contact with that particular segment. When the parts are rotating, brush 57 will move over the commutator 56 in the direction of the arrow, while commutator 48 rotates in the direction of the arrow past the brush 54 and in this way the energiation of each of the different magnets constituting the motor field and armature is effected in a predetermined sequence so as to obtain the necessary torque for producing the power required and by means of which the generator is operated.

From the above description it will be seen that the motor generator that forms the subject of this invention is so constructed that it is a unitary machine in which the generator surrounds the motor and in which the motor armature is connected with the generator field so that whenever the motor armature rotates it will cause a corresponding rotation of the generator field in the opposite direction and in which the generator field and the generator armature are interconnected by a differential gear mechanism that produces simultaneous rotation of the parts in opposite direction. The end frame members 5 are connected by means of longitudinally extending bars as shown in the drawings.

Having described the invention what is claimed as new is:

1. A motor generator comprising, in combination, a support, a motor field frame and field windings carried by the support and held against movement with respect thereto, a motor armature located within the motor field frame and mounted for rotation with respect thereto, a cylindrical generator field frame and a cylindrical generator armature surrounding the motor field frame, power transmission means interposed between the motor armature and one of the generator elements for producing simultaneous relative rotation in opposite directions, and power transmission means between the two generator elements for producing relative rotation of the parts in opposite direction.

2. A motor generator comprising, in combination, a support, a motor field frame and field windings carried by the support and held against movement with respect thereto, a motor armature located within the motor field frame and mounted for rotation with respect thereto, a cylindrical generator field frame and a cylindrical generator armature surrounding the motor, power transmission means interposed between the motor armature and the generator field for producing simultaneous rotation of the two in opposite direction, and another power transmission means interposed between the generator armature and the generator field for producing simultaneous rotation of these elements in opposite direction.

3. A motor generator comprising, in combination, a support, a motor field frame and field windings carried by the support and held against movement with respect thereto, a motor armature located within the motor field and mounted for rotation with respect thereto, a cylindrical generator field and a cylindrical generator armature surrounding the motor, power transmission means interposed between the motor armature and one of the generator elements for producing simultaneous relative rotation in opposite directions, power transmission means between the two generator elements for producing relative rotation of the parts in opposite direction, and means for distributing current to the armature coils and to the field coil magnets of the motor, said means comprising two slip rings and a commutator carried by the motor armature, a commutator carried by the motor frame, a brush carried by the motor frame and contacting with the commutator carried by the armature, two brushes carried by the motor field frame and contacting with the slip rings, and another brush secured to the commutator that is carried by the armature and contacting with the commutator carried by the motor field frame.

4. A motor generator comprising, a motor having an elongated cylindrical armature mounted to rotate about its axis and a hollow cylindrical motor field frame enclosing the armature and held against rotation, a generator comprising a cylindrical field and a cylindrical armature surrounding the motor field frame, the generator field frame and armature being mounted for rotation, power transmission means interposed between the generator field frame and generator armature to produce simultaneous rotation in opposite direction, and power transmission means interposed between the motor armature and one of the generator elements to transmit motion from the motor armature to the generator.

5. A motor generator comprising, in combination, a support, a shaft carried by the support and mounted for rotation, a plurality of armature magnets carried by the shaft and arranged in axially spaced groups, a plurality of motor field coils carried by the support and arranged in axially spaced groups, each group of field magnets corresponding in number to the magnets of the armature and surrounding the latter, means for simultaneously energizing one field and one armature magnet of each group in a predetermined sequence whereby a uniform torque is produced which is the total of the torque impulses produced each revolution by the energization of the several pair of magnets, a generator field frame surrounding the motor field frame, a generator armature surrounding the generator field frame, the generator field frame and armature being mounted for simultaneous rotation in opposite directions, power transmission means between the motor armature and the generator field for producing simultaneous rotation in opposite directions and power transmitting means between the generator field and the generator armature for simultaneously rotating them in opposite directions.

6. A motor generator having a hollow elongated supporting frame provided at its ends with inwardly extending axially aligned tubular bearings, an elongated tubular field frame nonrotatably supported by the inner ends of the bearings and in concentric relation therewith, a tubular field frame mounted for rotation about the common axis of the aligned bearings, an elongated tubular armature frame located in the space between the elongated supporting frame and the rotatable field frame, a second armature located within the nonrotatable field frame and rotatable about the common axis of the bearings, and means for producing simultaneous rotation of the two armatures and the rotatable field frame, the two armatures rotating in the same direction and the rotatable field frame and the tubular armature rotating in opposite directions.

7. A motor generator comprising, in combination, a stationary tubular supporting frame, two coaxial bearings carried by the frame and projecting inwardly, there being one bearing at each end, a shaft mounted for rotation in the bearings, an armature secured to the shaft, a tubular field frame surrounding the armature, supporting means between the ends of the field frame and the bearings, a hollow field frame encircling the tubular field frame, means for rotatably supporting the hollow field frame from the bearings, an armature frame surrounding the hollow field frame, means for rotatably supporting the armature from the bearings, the two armatures and the rotatable field being rotatable about a common axis, and means for producing simultaneous relative rotation between the two armatures and their corresponding fields.

In testimony whereof we affix our signatures.

WILLIAM E. MASTERSON.
HENRY PRICE.